United States Patent
Greenlee et al.

(10) Patent No.: US 7,139,939 B2
(45) Date of Patent: Nov. 21, 2006

(54) SYSTEM AND METHOD FOR TESTING SERVERS AND TAKING REMEDIAL ACTION

(75) Inventors: Gordon G. Greenlee, Endicott, NY (US); Richard E. Weingarten, Eric, CO (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 10/600,210

(22) Filed: Jun. 20, 2003

(65) Prior Publication Data

US 2004/0268176 A1    Dec. 30, 2004

(51) Int. Cl.
G06F 11/00    (2006.01)
(52) U.S. Cl. .............................. 714/55; 714/4; 714/15
(58) Field of Classification Search .................. 714/55, 714/4, 7
See application file for complete search history.

(56) References Cited

U.S. PATENT DOCUMENTS

| | | | |
|---|---|---|---|
| 6,178,529 B1 | 1/2001 | Short et al. ................... 714/51 |
| 6,301,615 B1 | 10/2001 | Kutcher ...................... 709/224 |
| 6,434,713 B1* | 8/2002 | Shin et al. .................... 714/25 |
| 6,584,502 B1 | 6/2003 | Natarajan et al. ........... 709/224 |
| 6,601,061 B1* | 7/2003 | Holt et al. ...................... 707/3 |
| 6,687,799 B1* | 2/2004 | Smullen et al. ............. 711/154 |
| 6,976,186 B1* | 12/2005 | Gardner .......................... 714/4 |
| 6,986,139 B1* | 1/2006 | Kubo .......................... 718/105 |
| 2002/0032777 A1* | 3/2002 | Kawata et al. .............. 709/226 |

FOREIGN PATENT DOCUMENTS

EP    1172746 A2    1/2002

OTHER PUBLICATIONS

OCM—A Monitoring System for interoperable Tools by: R. Wismuller, J. Trinitis, T. Ludwig p. 1-9 Research Disclosure Apr. 2000 p. 776.

(Continued)

Primary Examiner—Scott Baderman
Assistant Examiner—Joshua Lohn
(74) Attorney, Agent, or Firm—Arthur J. Samodovitz

(57) ABSTRACT

A method for monitoring a plurality of servers in a cluster and taking corrective action for the servers. A request to one of the servers is sent. Then, a determination is made if the one server successfully handles the request and how long it took for the one server to handle the request. If a response is received indicating that the one server successfully handled the request, but it took the one server longer than a predetermined time period to handle the request, a dispatcher for the one server is notified to reduce, but not eliminate, a workload of the one server. There is specified a number of consecutive requests that can be sent to a server and not handled by the server within a specified time period for each of the requests; the number indicates that the server is down. A request is sent to one of the servers, and a determination is made that the one server did not successfully handle the request within the specified time period. A determination is made that the number has not yet been attained and therefore, no corrective action is taken. A subsequent request is sent to the one server, and a determination is made that the one server did not successfully handle the request within the specified time period. A determination is made that the number has been attained and therefore, corrective action is taken.

9 Claims, 3 Drawing Sheets

OTHER PUBLICATIONS

Integrating Heterogeneous Communication and Messaging Systems in an Object-Oriented Middleware Framework George Kogiomtzis & Drakoulis Martakos p. 488-493.

Agent Middleware for Heterogeneus Scientific Simulations By: Shirun Ho, Satoshi Itoh, Sigeo Ihara & Richard D. Schlichting p. 1 0f 25 Sep. 10, 2003.

* cited by examiner

SYSTEM AND METHOD FOR TESTING SERVERS AND TAKING REMEDIAL ACTION

The invention relates generally to computer systems, and deals more particularly with a technique to test operability of servers and take remedial action if needed.

Computer servers are often grouped into clusters to perform tasks requested by clients. The clustering of servers provides a pool of shared resources and backup in case of failure of one server. The servers can provide a variety of services/applications for clients. For example, the servers can furnish web pages to clients/users. An IBM Directory Server ("IDS") system furnishes web pages that provide directory information about employees in an enterprise. Each such web page lists the name of an employee and his or her telephone number, job title, department name, etc.

IDS is structured and used as follows. A client/user invokes the IDS system by specifying a URL of a front end web server, or selecting a link that specifies the URL of the front end the web server. The invocation request is received by a network dispatcher for a cluster of front end servers, and then passed to one of the front end servers for handling. The selected front end server returns an "entry" web page to the client/user. The entry web page includes a blank field for the user to enter an employee name and request the directory information for this employee. The employee name is sent to the network dispatcher which forwards it to one of the front end web servers, based on a round robin or other load balancing algorithm, for handling. The selected front end web server converts the requested search to an IDS client transaction using IETF RFC 2252 protocol, and then sends the IDS client transaction to a network dispatcher for a cluster of IDS servers. This network dispatcher can be the same physical network dispatcher described above but in the dispatching role for a different cluster of servers, i.e. the IDS servers instead of the front end web servers. Alternately, this network dispatcher can be a different physical network dispatcher. The network dispatcher then forwards the IDS client transaction to one of the IDS servers, based on a load balancing algorithm. The selected IDS server fetches the directory information required to form the web page requested by the client/user. Then, the IDS server forwards this information directly to one of the front end web servers, bypassing the network dispatcher. The front end web server reformats the information into a web page and returns it directly to the client/user, bypassing the network dispatcher.

Other types of clients, that do not need information in the form of a web page, can also access the cluster of IDS servers (via the latter network dispatcher) bypassing the cluster of front end servers (and their dispatcher). These other types of clients send their authentication and information requests in IETF RFC 2252 protocol directly to the network dispatcher for the cluster of IDS servers. The selected IDS server will respond to the request directly to this other type of client bypassing the cluster of front end servers.

If a server (IDS or other) fails, it is important to detect the problem and take some remedial action. It was known for a testing server simulating this other type of client to test each IDS server by sequentially sending out search requests to each IDS server, bypassing the front end servers and the network dispatcher for the cluster of IDS servers. The requests were to furnish the directory information (not in the form of a web page) for a specified employee. If there was a response to the search request, the return code was analyzed. If the return code indicated "Operational", then the server was considered operational and no remedial action was taken. If the return code indicated "No IDS Server Contact", then the test server sent an e-mail to the systems administrator describing the problem. Then, the systems administrator could investigate and correct the cause of the failure. If there was no response to the search request, then the test server continued to wait indefinitely, no search requests were sent to any other IDS servers, and the systems administrator was not notified. While this technique is effective in the cases where a return code was received, it still relied heavily on the systems administrator to assess and resolve the problem. This technique was not effective in the cases where no response was received.

An object of the present invention is to provide an automated technique to assess and correct problems with servers.

A more specific object of the present invention is to provide an automated technique of the foregoing type, which is applicable to a cluster of servers.

Another object of the present invention is to provide an automated technique of the foregoing types which does not burden the operational servers.

SUMMARY OF THE INVENTION

The invention resides a method for monitoring a plurality of servers in a cluster and taking corrective action for the servers. A request to one of the servers is sent. Then, a determination is made if the one server successfully handles the request and how long it took for the one server to handle the request. If a response is received indicating that the one server successfully handled the request, but it took the one server longer than a predetermined time period to handle the request, a dispatcher for the one server is notified to reduce, but not eliminate, a workload of the one server.

According to one feature of the present invention, if the one server does not successfully handle the request within another predetermined time period longer than the first predetermined time period or does not respond that it handled the request within the other predetermined time period, the dispatcher is notified to remove the one server from the cluster or not to send any subsequent requests to the server.

According to another feature of the present invention, if the one server does not successfully handle the request within the other predetermined time period or does not respond that it handled the request within the other predetermined time period, a request to restart the one server is automatically sent to the one server.

The invention also resides in another method for monitoring a plurality of servers in a cluster and taking corrective action for the servers. There is specified a number of consecutive requests that can be sent to a server and not handled by the server within a specified time period for each of the requests; the number indicates that the server is down. A request is sent to one of the servers, and a determination is made that the one server did not successfully handle the request within the specified time period. A determination is made that the number has not yet been attained and therefore, no corrective action is taken. A subsequent request is sent to the one server, and a determination is made that the one server did not successfully handle the request within the specified time period. A determination is made that the number has been attained and therefore, corrective action is taken.

DETAILED DESCRIPTION OF THE PREFERRED EMBODIMENTS

Figure 1:
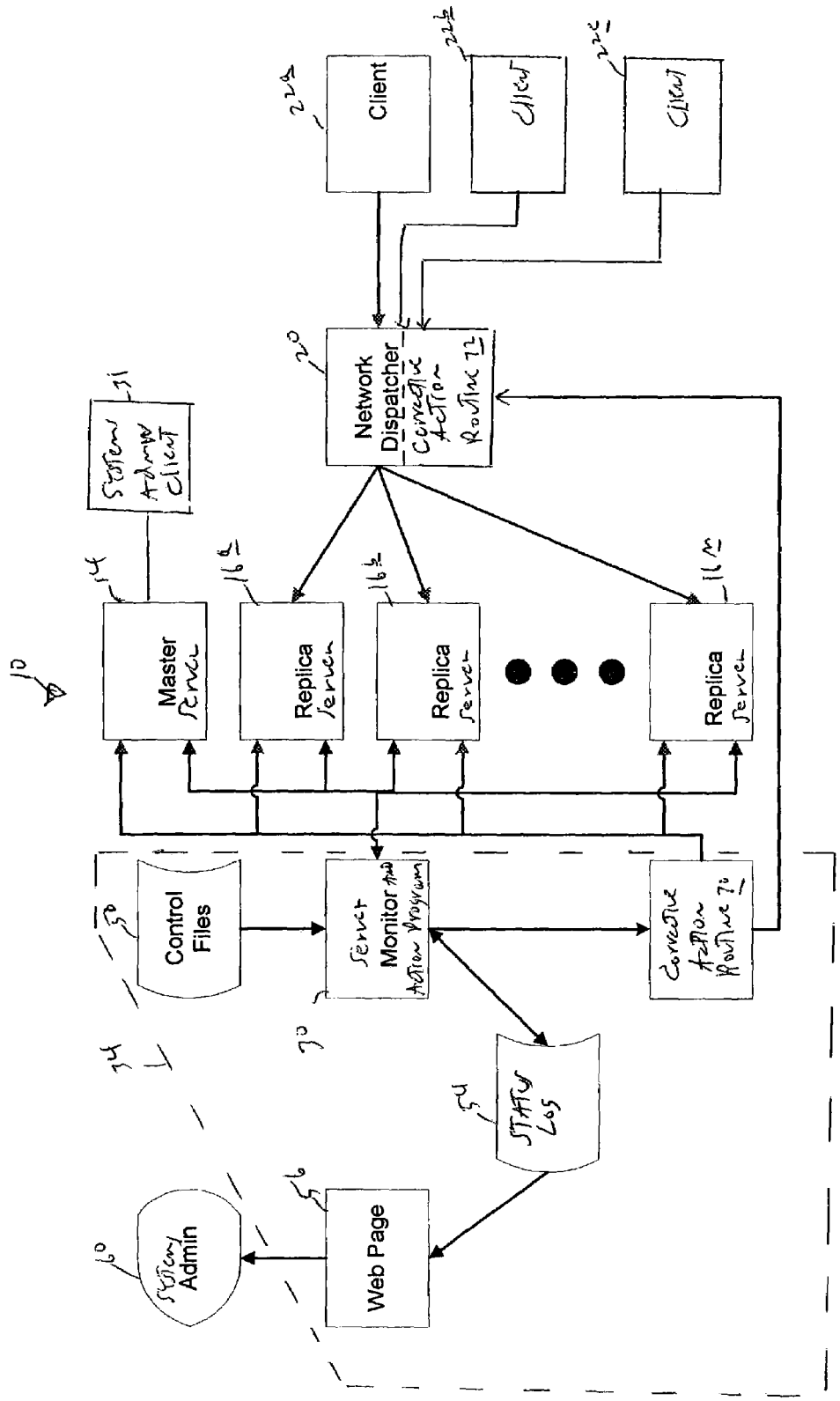
FIG. 1 is a block diagram of a computer system according to one embodiment of the present invention.

Referring now to the figures in detail wherein like reference numbers indicate like elements throughout, FIG. 1 illustrates a computer system generally designated 10 according to one embodiment of the present invention. System 10 comprises a known cluster 12 of computer servers 14 and 16a,b, . . . n. By way of example, cluster 12 comprises a main server 14 and replica servers 16a,b . . . n, although for many applications that can utilize the present invention, all the servers in the cluster are the same. The function of the servers is not critical to the present invention. Many clusters of servers providing a wide variety of service to clients can utilize the present invention. One example of a type of server that can utilize the present invention is a server that furnishes web pages to a client/user. Another example of a type of server that can utilize the present invention is a server that furnishes other forms of information to a client/user. Each of clients 22a,b,c of the server cluster 12 comprises a workstation and a web browser or other application executing at the workstation to make requests for web pages. A network dispatcher 20 receives the requests from clients 22a,b,c for a web page or other information, and routes them to an appropriate one of the servers 16a,b . . . n, based on round robin, other load balancing algorithm or other criteria. Server 14 handles requests from a systems administrator at client work station 31 to update a master copy of the web pages or other information, and then copies the updates to the replica servers 16a,b . . . n.

According to the present invention, system 10 also includes a server status monitor and action program 30 executing in another server 34. As explained in more detail below, program 30 sends out search requests for web pages or requests for other information directly to specific servers 14 and 16a,b . . . n (as "targets", bypassing network dispatcher 20) to determine the operational status of the servers 14 and 16a,b . . . n. Some types of requests will require use of the following hardware and software within servers 14 and 16a,b . . . n: network communication ports, any protocol conversion software used to convert the format of the request to the format of the data base, the data base, processor, cache, disk drives and physical storage devices. If the server properly handles the request in a timely manner, then the server is considered fully operational. In the illustrated embodiment, the requests to servers 16a,b . . . n by server 34 simulate those made by clients 22a,b,c via network dispatcher 20. Also, in the illustrated embodiment, the requests to server 14 by server 34 simulates those made by a systems administrator client 31. The requests from server 34 to servers 14 and 16a,b . . . n can be in the form of a variety of protocols such as Ethernet, HTTP, FTP, TCP/IP, UDP, etc. Server 34 also includes control files 50 which provide parameters for program 30—a maximum time "X" to wait for a response from a target server to a request (afterwards, the server is considered "down"), a shorter time "Y" to receive a response from a target server considered fully operational, and a name of a directory to store server status files. A target server which responds after time "Y" but before time "X" is considered operational but "slow" or encumbered. Program 30 stores in log 54 information identifying the requests, describing the responses to the requests and the status of the target servers. From that log, program 30 also builds a web page 56 or other display screen to present the information to a local systems administrator 60.

Program 30 also calls a routine 70 to take certain types of remedial action directly on server 14 or 16a,b . . . n when the server is not fully operational. Corrective action routine 70 can also call a corrective action routine 72 in network dispatcher 20 to request that network dispatcher 20 take other types of remedial action on a server 16a,b . . . n when not operational or slow in operation. The calls from server 34 to network dispatcher 20 can be in the form of a variety of network protocols such as TCP/IP.

Figure 2:
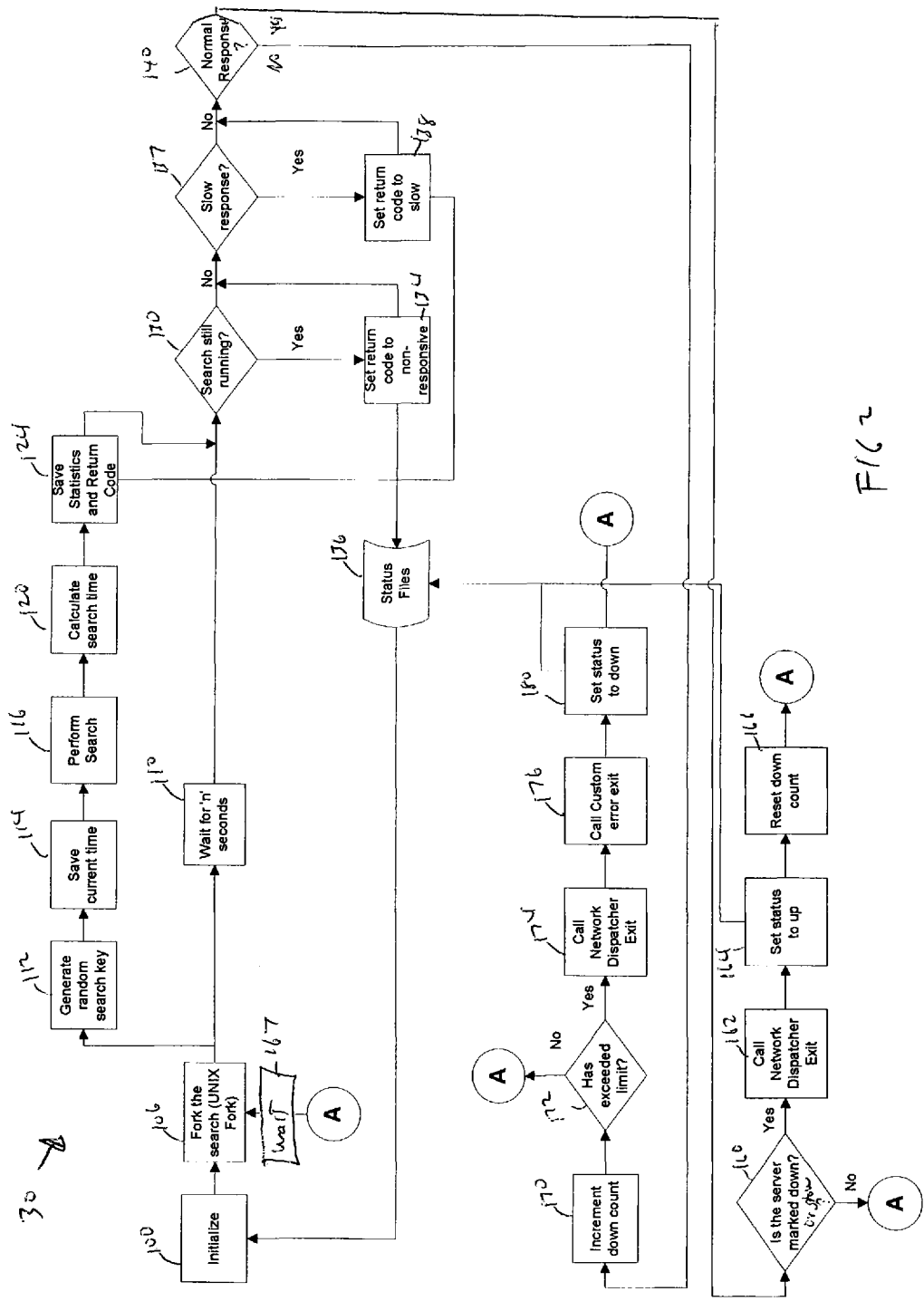
FIG. 2 is a flow chart illustrating operation of a server status monitor and action program within the computer system of FIG. 1, according to one embodiment of the present invention.

FIG. 2 illustrates the function of server status monitor and action program 30 in more detail. The steps of FIG. 2 are performed separately for each of the servers 14 and 16a,b . . . n, preferably in parallel or concurrently, using multitasking or other such technique. In step 100, a thread of program 30 is invoked and initialized, i.e. the parameters of control file 50 are loaded into the program 30 thread for the target server. Also, a current status and a "down count" of the target server as recorded in log 54 are restored. The current status may be fully operational, operational but slow, or down. The "down count" indicates the number of consecutive clients requests were not handled in a timely manner. Both of these parameters are used later by program 30, as described below. After initialization, program thread 30 generates a second, "child" thread for the original "parent" thread (step 106). In the illustrated example where server 34 is running UNIX operating system, the creation of the second, child thread is made by a "Fork" request to the operating system. Then, there are two independent threads, a "parent" and a "child", for the target server. For the parent thread, program 30 begins a timer to wait for "X" time to elapse (step 110). An operational server, even encumbered by a heavy workload, should return a response within the time "X"; if not, as described below, the server is considered "down". By way of example, time "X" is sixty seconds, although this will vary from application to application and from cluster to cluster. For the child thread, program 30 generates a random request for the target server (step 112). That random request ensures that important hardware and software within the target server is checked. (Repeated requests for the same information may be satisfied by a cached copy and will not check as much of the target server as a random request. Random searches are not likely cached causing exercise of more of the target server.) In an example where the servers furnish web pages, the random request is based on generating a URL request for a random web page stored by the servers. Then, program 30 records the current time (step 114). This will be used later to calculate the time for the target server to respond to the request. Soon afterward the current time is recorded, program 30 (child thread) sends the request directly to the target servers 14 or 16a,b . . . n (step 116). Then, program 30 waits for a response to the request (up to time "X"), and calculates the time for the target server to respond to the request after it was sent (by subtracting the time the request was sent from the response time) (step 120). Program 30 stores in log 54 the initial return code for the request—"Successful Response" or "No Server Contact" and the elapsed time for the response (step 124). "Successful Response" means that the target server successfully handled the search by returning the requested web page or other information. "No Server Contact" means that server 34 was not able to contact the target server, either because a communication link was down or the server was down. Next, program 30 determines if the request is still pending at the end of the "X" time-out, i.e. a response has not yet been received from the target server and the "No Server Contact" return code has not been received from server 34 (decision 130). If the request is still pending, then program 30 (parent thread) sets a return code to "Server Non Responsive" to indicate a problem with the target server (step 134). Also, program 30 records this return code in log 54 (step 136). After storing the "Server Non Responsive" return code in step 136, or after a "no" output of decision 130 (indicating that the request was not pending at time "X"), program 30 (parent thread) proceeds to decision 137. In decision 137, program 30 checks the time for the successful target server response, if any. If there was a successful response from the target server, and the successful response was received in more than "Y" time but less than "X" time, program 30 sets the return code to "Slow Response" (step 138) and records the request and return code in log 54 (step 124). After recording the "Slow Response" return code or from the no output of decision 137 (i.e. there was not a "Slow Response"), program 30 checks the return code and response time recorded in step 124 to determine if the response, if any, was normal, i.e. the request was successful and performed in less than "Y" time period. If so, then program 30 proceeds to decision 160 to determine if the target server is currently indicated as non operational/ "down" or operational/"slow". (This status was obtained from control file 50 earlier as a result of previous requests.) If not, then program 30 jumps back to step 106 to repeat the foregoing steps after waiting 'n' seconds with 'n' being a wait period specified in the configuration file (step 167). If so, program 30 notifies the network dispatcher routine 72 that the target server is fully operational (step 162). If the server is currently marked "down", routine 72 will re-include the target server into cluster 12, so that network dispatcher 20 will once again send client requests to the target server. (Earlier, the network dispatcher was instructed by routine 70 to remove the target server from cluster 12, i.e. not to send any further requests to the target server until further notice.) If the server is currently marked "Slow Response", routine 72 will resume a normal workload assignment to the server. In both cases, program 30 will change the status of the target server to "Operational" in control file 50 and status file 54 (steps 164 and 136). Finally, program 30 will reset the server "down" counter to zero (step 166). The server down counter counts the number of times that program 30 has sent out a request without a successful response within time "X".

Referring again to decision 140, if there was not a successful response from the target server within time "Y", then program 30 proceeds to step 170. In step 170, program 30 increments the server "down" counter. Then, server 30 checks if the server "down" counter has exceeded a predetermined limit (which is a programmable/customizable integer greater than or equal to zero) (decision 172). If not, then program 30 jumps back to step 106. (If the limit is greater than "zero", then program 30 will tolerate at least one failed request before initiating any corrective action. Program 30 will assume that the number of failed requests less than the limit represent some type of problem that does not require corrective action, such as a temporary unavailability of the target server or the communication link to the target server, an error in the communication to the target server, or a temporary database failure.) However, if the server "down" counter is greater than the limit, then program 30 calls the network dispatcher routine 72 and supplies the latest return code (step 174). If the latest return code for the target server was "Server Non Responsive" (i.e. there was no response to the request within the relatively long time "X") or "No Server Contact" (i.e. there was no contact made to the target server), then routine 72 will assume that the target server is down, and effectively remove the target server from the cluster 12. In other words, network dispatcher will not send any more client requests to the target server until the network dispatcher is subsequently notified that the target server has been restarted. If the latest return code for the target server is "Slow Response", then routine 72 will notify the network dispatcher to reduce the frequency of sending client requests to the target server or otherwise reduce the workload of the target server, because the target server is currently over burdened. After step 174, program 30 also calls local routine 70 and supplies the latest return code (step 176). If the latest return code is "No Server Contact", local routine 70 will attempt to restart the target server by issuing a remote start command, and then notify a systems administrator. If the latest return code is "Non Responsive", then local routine 70 will request a memory dump from the target server of server processes, and then notify a systems administrator. If the latest return code is "Slow Response, then local routine 70 will do nothing because this problem is more effectively handled by the network dispatcher 20, as described above. After completion of step 176, program 30 sets the status of the target server to "down", and then records the status in control file 50 and status file 54 (step 180). Then, program 30 loops back to step 106.

Figure 3:
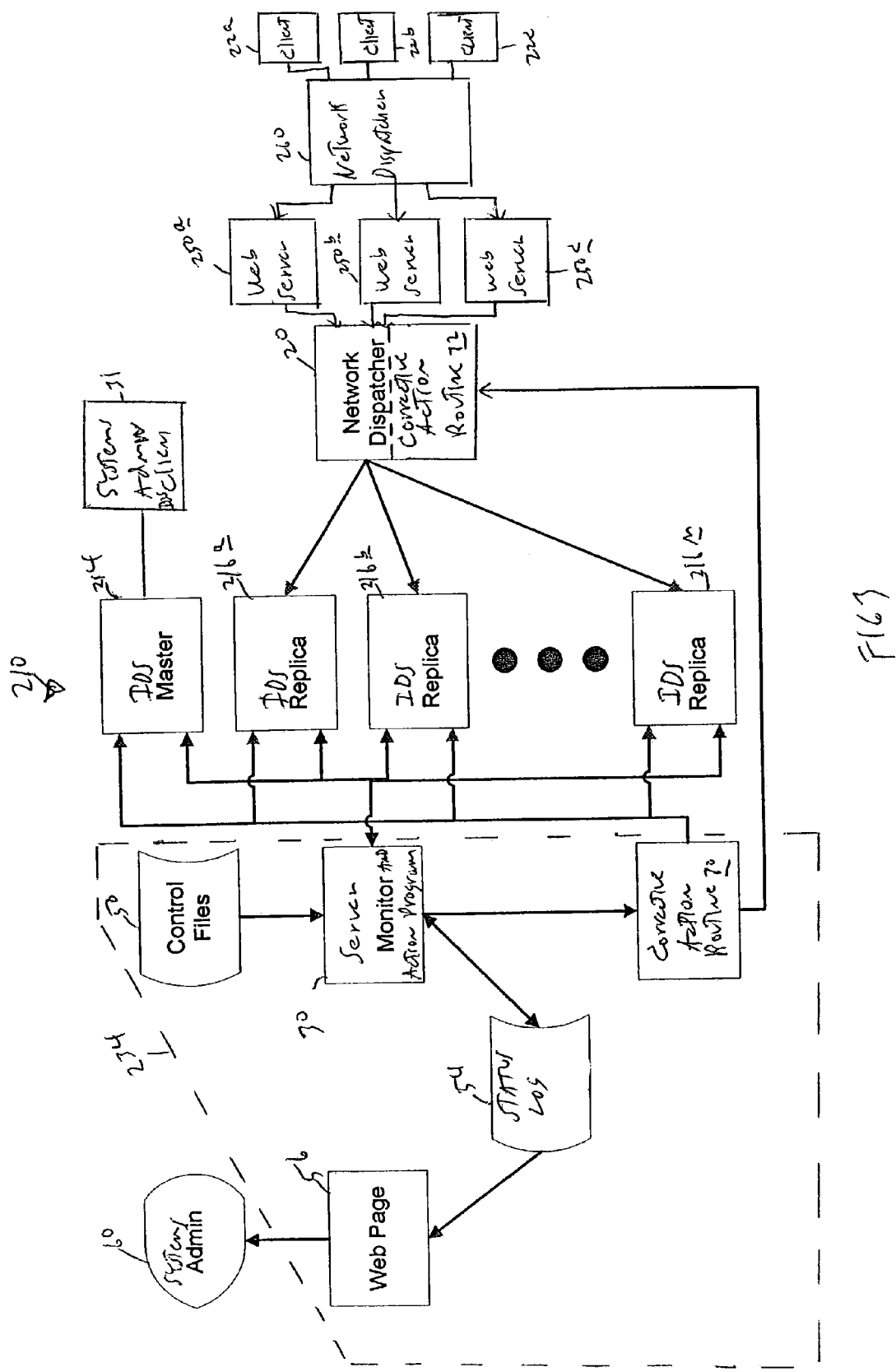
FIG. 3 is a block diagram of a computer system according to another embodiment of the present invention.

FIG. 3 illustrates a computer system 210 according to a second, specific environment in which the present invention can be used. System 210 is the same as system 10 except as follows. In system 10, servers 14 and 16*a,b* . . . *n* can receive requests for web pages or information in other forms, and return the requested web page or information in other forms. In system 210, servers 214 and 216*a,b* . . . *n*, which replace servers 14 and 16*a,b* . . . *n*, receive requests for information in a form other than a web page and furnish responsive information in a form other than a web page. In the example illustrated in FIG. 3, servers 214 and 216*a,b* . . . *n* are IBM Directory Servers ("IDS"), and the clients request web pages. Servers 214 and 216*a,b* . . . *n* pass the requested information directly to front end web servers 250*a,b,c* (bypassing network dispatcher 20) and rely on web servers 250*a,b,c* to convert the information furnished by servers 214 and 216*a,b* . . . *n* into a web page format to be provided to the clients 22*a,b,c*. Servers 250*a,b,c* return the requested web page directly to clients 22*a,b,c* (bypassing network dispatcher 260). Network dispatcher 260 receives web page requests from the clients 22*a,b,c* of system 210 and distributes them to web servers 250*a,b,c* based on round robin or other load balancing algorithm. Web servers 250*a,b,c* convert the web page requests to a non web page format, compatible with servers 214 and 216*a,b* . . . *n*. Then, web servers 250*a,b,c* pass the information requests to network dispatcher 20, which in turn, distributes the requests to servers 216*a,b,c* based on round robin or other load balancing algorithm. Monitoring and action program 30 requests and receives information from servers 214 and 216*a,b* . . . *n* in a non web page format, compatible with servers 214 and 216*a,b* . . . *n*. The operation of program 30 in system 210 is the same as that in system 10.

Based on the foregoing, a server status monitor program in accordance with the present invention has been disclosed. However, numerous modifications and substitutions can be made without deviating from the scope of the present invention. For example, routines 70 and 72 can be altered to take actions based on debug requirements allowing the collection of information to provide to server support personnel. Therefore, the present invention has been disclosed by way of illustration and not limitation, and reference should be made to the following claims to determine the scope of the present invention.

The invention claimed is:

1. A system for managing a plurality of servers in a cluster, said system comprising:
   means for sending a request to one of said severs;
   means, responsive to said one server handling said request after a first predetermined time-out but before a second, greater predetermined time-out, for incrementing a count, and responsive to said one server not handling said request by said second predetermined time-out, for incrementing said count without determining if said one server is currently operational;
   means, responsive to the incremented count being less than a predetermined integer threshold greater than one, for taking no corrective action;
   means, responsive to the incremented count equaling said threshold and said one server handling said request after said first predetermined time-out but before said second predetermined time-out, for automatically notifying a dispatcher for said one server to reduce a rate of dispatching new requests to said one server, and
   means, responsive to the incremented count equaling said threshold and said one server not handling said request by said second predetermined time-out, for automatically initiating a memory dump of said one server.

2. A system as set forth in claim 1, wherein said servers reside on a network, and said request is a test request; and
   further comprising a network dispatcher for receiving client requests from client computers and dispatching said client requests to said servers including said one server; and
   wherein the test request and the automatic initiation of the memory dump bypass said network dispatcher.

3. A system as set forth in claim 1 wherein said means for automatically initiating a memory dump of said one server automatically initiates said memory dump without determining if said one server is operational.

4. A method for managing a plurality of servers in a cluster, said method comprising the steps of:
   sending a first request to one of said servers, and incrementing a count (a) in response to said one server handling said first request after a first predetermined time-our but before a second, greater predetermined time-out or (b) without determining if said one server is currently operational, in response to said one server not handling said first request by said second predetermined time-out; and wherein the incremented count is less than a predetermined integer threshold greater than one, and in response, taking no corrective action;
   sending a second request to said one server, and further incrementing said count (a) in response to said one server handling said second request after said first predetermined time-out but before said second predetermined time-out or (b) without determining if said one server is currently operational, in response to said one server not handling said second request by said second predetermined time-out; and wherein the further incremented count is equal to said threshold, and
   if said one server handled said second request after said first predetermined time-out but before said second predetermined time-out, automatically notifying a dispatcher for said one server to reduce a rate of dispatching new requests to said one server, and
   if said one server did not handle said second request by said second predetermined time-out, automatically initiating a memory dump of said one server.

5. A method as set forth in claim 4,
   wherein said servers reside on a network;
   wherein said first and second requests are test requests;
   further comprising the steps of client computers sending client requests to a network dispatcher for said servers, and said network dispatcher dispatching said client requests to said servers including said one server; and
   wherein said first and second requests and the automatic initiation of the memory dump bypass said network dispatcher.

6. A method as set forth in claim 4 wherein the step of automatically initiating a memory dump of said one server is performed without determining if said one server is operational.

7. A system for managing a plurality of servers in a cluster, said system comprising:
   means for sending a request to one of said servers;
   means for (a) determining if said one server is not currently operational, (b) determining if said one server handled said request after said first predetermined time-out but before a second, greater predetermined time-out, and (c) determining if said one server did not handle said request by said second predetermined time-out without determining if said one server is currently operational; and
   means, responsive to (a), (b) or (c), for incrementing a count, comparing the incremented count to a predetermined integer threshold greater than one, and if said incremented count is less than said threshold, taking no corrective action, and if said incremented count equals said threshold,
   if said one server is not currently operational, automatically issuing a remote restart of said one server,
   if said one server is currently operational and handled said other request after said first predetermined time-out but before said second predetermined time-out, automatically notifying a dispatcher for said one server to reduce a rate of dispatching new requests to said one server, and
   if said one server did not handle said other request by said second predetermined time-out, automatically initiating a memory dump of said one server.

8. A system as set forth in claim 7, wherein said servers reside on a network, and said request is a test request; and
   further comprising a network dispatcher for receiving client requests from client computers and dispatching said client requests to said servers including said one server; and
   wherein the test request and the automatic initiation of the memory dump bypass said network dispatcher.

9. A system as set forth in claim 7, wherein the means for automatically initiating a memory dump of said one server automatically initiates said memory dump of said one server without determining if said one server is operational.

* * * * *